H. J. FRISSE.
POTATO DIGGER.
APPLICATION FILED APR. 3, 1908.
901,608.
Patented Oct. 20, 1908.
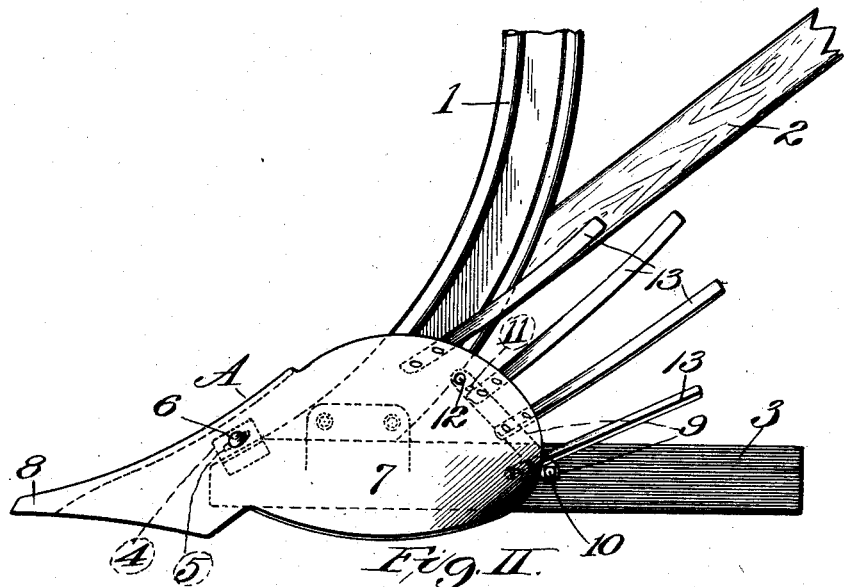
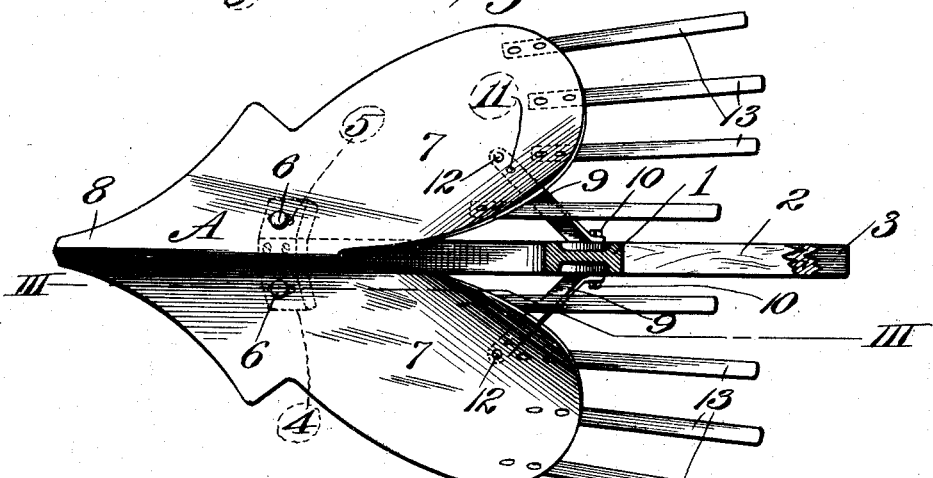
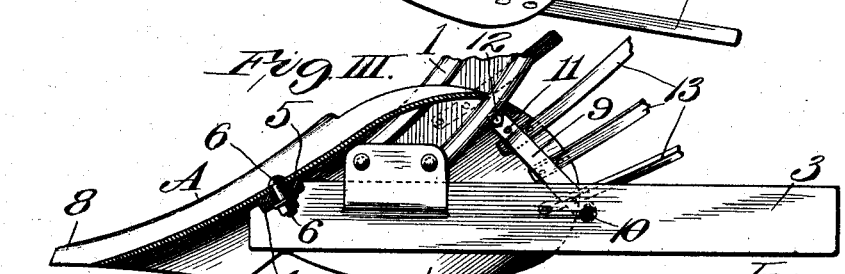
Inventor
H. J. Frisse,

UNITED STATES PATENT OFFICE.

HERMAN J. FRISSE, OF NEAR PIERRON, ILLINOIS.

POTATO-DIGGER.

No. 901,608.　　　　Specification of Letters Patent.　　　　Patented Oct. 20, 1908.

Application filed April 3, 1908. Serial No. 424,970.

*To all whom it may concern:*

Be it known that I, HERMAN J. FRISSE, a citizen of the United States of America, and a resident of Madison county, near the city of Pierron, in the county of Bond and State of Illinois, have invented certain new and useful Improvements in Potato-Diggers, of which the following is a full, clear, and exact description, reference being had to the accompanying drawing, forming part of this specification.

My invention relates to an implement in the nature of a plow for digging potatoes and it has for its object, the construction of an implement of this character that provides for the soil being thrown laterally, while the potatoes dug are conducted rearwardly and separated from the major portion of the soil, in order that they will be exposed to view in the path of the implement instead of being covered by the soil as it falls from the implement.

A further object of my invention is the provision of means whereby the plow of the potato digger is adjustably mounted to permit of its being tilted forward or rearward in order that it will enter to a greater or less depth into the soil.

Figure I is a side elevation of my potato digger. Fig. II is a top or plan view. Fig. III is a vertical longitudinal section taken on line III—III, Fig. II.

In the accompanying drawings: 1 designates the plow beam and 2 one of a pair of handles attached to said beam, these members being shown in part only.

3 designates a carrier bar secured to the lower end of the beam 1, and having arms extending both forwardly and rearwardly from said beam, as seen in dotted lines, Figs. I and II, and full lines Fig. III.

4 is a cross piece fixed to an incline on the forward arm of the carrier bar 3 and provided with bolt holes 5 that receive bolts 6.

A designates a plow which comprises two diverging mold boards 7 and a share 8 which is common to both mold boards. The plow A is adjustably attached to the cross piece 4 by the bolts 6 which extend through the mold boards at the rear of the share 8 where it merges into the mold boards.

9 designates a pair of stays attached at their lower ends to the rear arm of the carrier bar 3 by suitable means such as a bolt 10 passing through the stays and carrier bar. The stays extend to the rear sides of the mold board 7 and they are provided with a plurality of bolt holes 11 adapted to receive bolts 12 that serve to connect the stays to the mold boards.

13 are prongs or fingers attached to the underside of the mold boards 7 and extending rearwardly therefrom in an upwardly inclined direction.

In the practical use of my potato digger, the soil in which the digger is operated is turned in two opposite directions by the mold boards of the plow A and thrown entirely clear of the plow, instead of passing over the rear ends of the mold boards. While the soil is being turned and thrown, as stated, the potatoes dislodged from the soil pass in an upward course upon the mold boards and over their rear ends to fall back of the mold boards where they are exposed to view without being covered by the soil as they are in the use of a plow having wings of other than mold board shape.

When it is desired to adjust the plow A to change its pitch in order that it will enter to a greater or less degree into the soil, the bolts 6 are loosened thereby permitting movement of the plow upon the cross piece 4 and the stays 9 are disconnected from the bolts 12 in the mold boards and said bolts are re-seated in the bolt holes in said stays after the plow has been tilted to the desired degree.

I claim:

1. In a potato digger, the combination of a beam, a carrier bar attached to said beam, a cross piece carried by said carrier bar, a double plow comprising a pair of mold boards, bolts connecting the plow to said cross piece, and stays whereby said mold boards are connected to said carrier bar, substantially as set forth.

2. In a potato digger, the combination of a beam, a carrier bar attached to said beam, a cross piece carried by said carrier bar, a double plow comprising a pair of mold boards, bolts adjustably connecting the plow to said cross piece, and stays whereby said mold boards are connected to said carrier bar, substantially as set forth.

3. In a potato digger, the combination of a beam, a carrier bar attached to said beam, a cross piece carried by said carrier bar, a double plow comprising a pair of mold boards, bolts connecting said plow to said cross piece, and stays whereby said mold boards are adjustably connected to said carrier bar, substantially as set forth.

HERMAN J. FRISSE.

In the presence of—
Mrs. H. J. FRISSE,
EMIL M. FRISSE.